Figure 1:
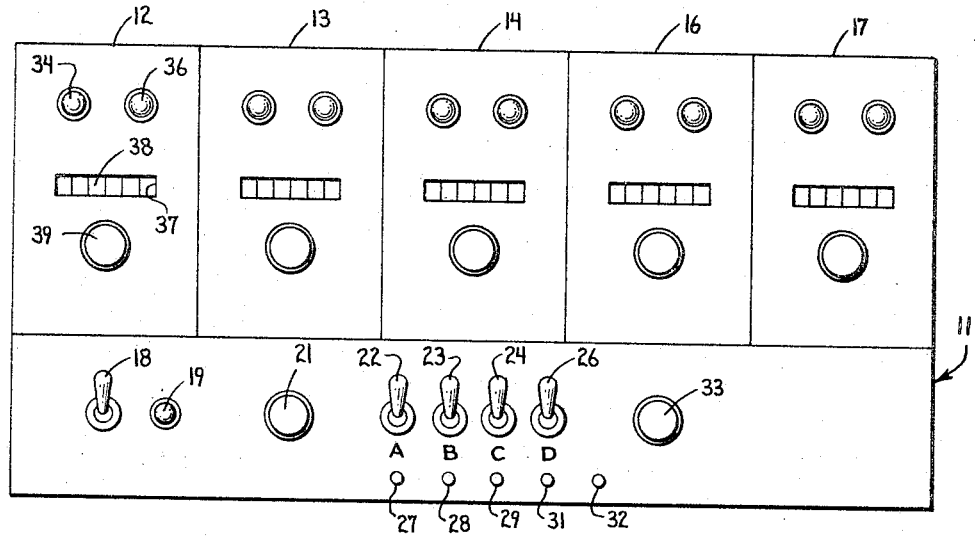

July 25, 1967  T. W. KIRKCONNELL ETAL  3,332,157
AUTOMATIC GRADING MACHINE
Filed March 8, 1966  4 Sheets-Sheet 1

INVENTORS.
THOMAS W. KIRKCONNELL
CARROLL WAYNE SCHULER
BY *Woodard, Weikart, Emhardt & Naughton*
Attorneys

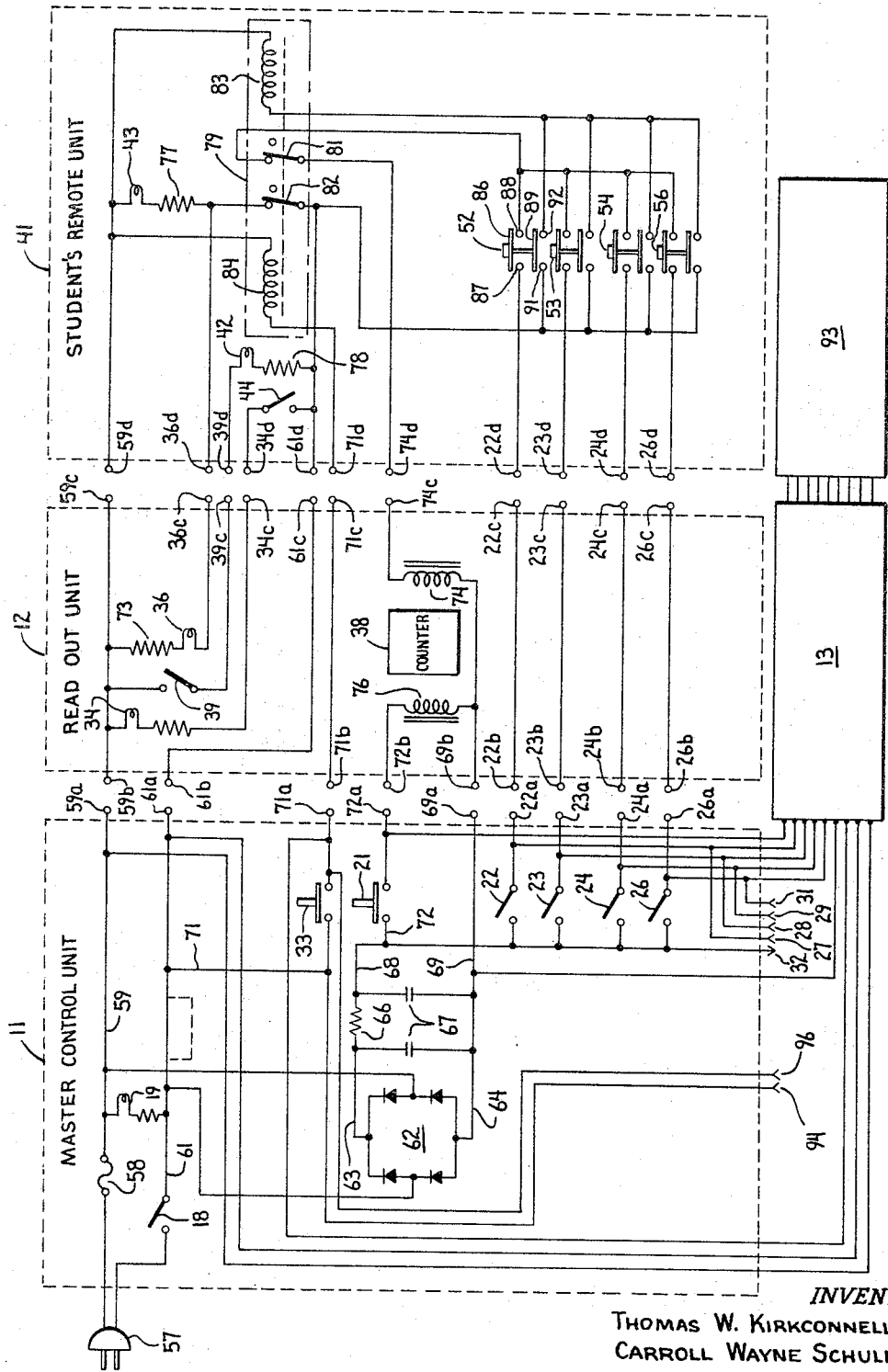

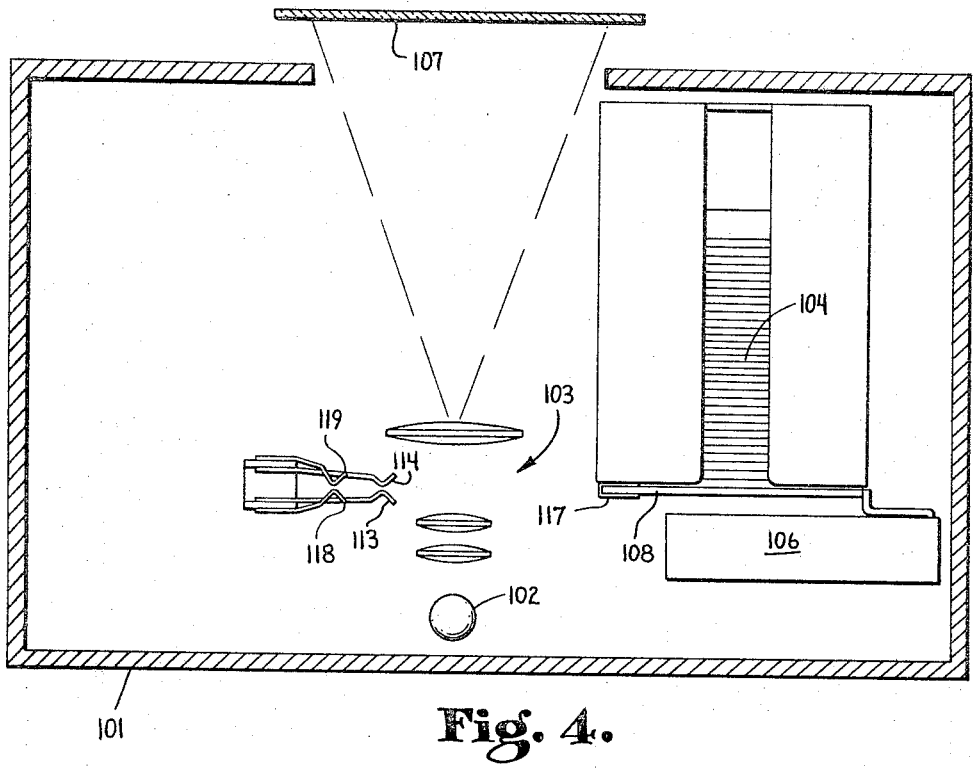
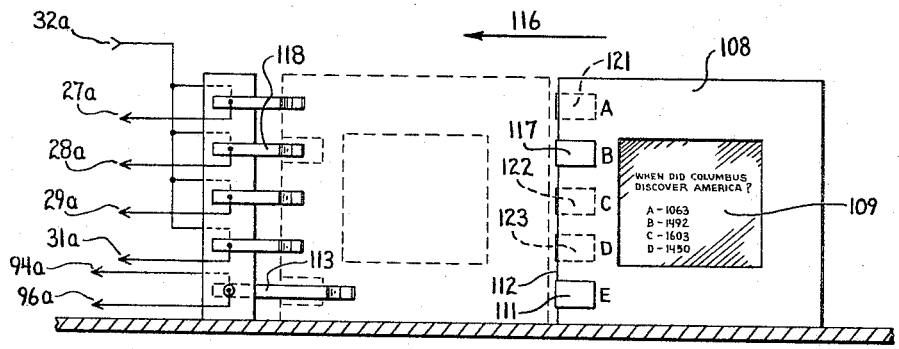

INVENTORS.
THOMAS W. KIRKCONNELL and
CARROLL WAYNE SCHULER

BY Woodard, Weikart, Emhardt & Naughton
Attorneys

United States Patent Office 3,332,157
Patented July 25, 1967

3,332,157
AUTOMATIC GRADING MACHINE
Thomas W. Kirkconnell, Cumberland, Md., and Carroll Wayne Schuler, Vincennes, Ind., assignors of one-third to Vincennes University, Vincennes, Ind.
Filed Mar. 8, 1966, Ser. No. 532,613
9 Claims. (Cl. 35—48)

This invention relates generally to teaching machines, and more particularly to a machine whereby an instructor, from a single location, can simultaneously test and grade individually, all of the students in a classroom.

Heretofore, many teaching and grading machines have employed a unit for each student in the classroom, and which includes means therein for presenting the test questions, means whereby the student selects the correct answer, and means for recording the correct answer or the number of correct answers attained by the student. Most such machines have employed some provisions in an effort to avoid cheating of the machines.

These machines of the prior art and the methods by which they have been used, require movement of the instructor around the classroom at some time or another, particularly when registration of each of the student's scores is required. Also, these machines have limited the ability of the instructor to control the amount of time which a student spends in answering an individual question.

The machines of the prior art have involved more expense than is sometimes desirable, even though many advancements have been made to reduce cost in teaching machines. They also require considerable attention to cheat-proofing.

It is, therefore, a general object of the present invention to provide an improved testing and grading system.

A further object is to provide apparatus enabling a single instructor to simultaneously question all of the students in the classroom and control the speed and the time spent on each question, by the students.

A further object is to provide apparatus whereby an instructor can, from a single location in a classroom, observe the progress of the students in achievement of correct answers.

A still further object is to provide apparatus for achieving the foregoing objects and minimizing the expense involved.

A still further object is to provide apparatus incorporating adequate cheat-proofing features without complexity.

Described briefly, a typical embodiment of the present invention employs a unit for use by the instructor, and a number of individual student's units, one student's unit at each student's desk. All of the student's units are connected to the instructor's unit, the latter of which has a counter register to designate the number of correct answers selected by each of the students.

Switches are provided on the instructor's unit and which, without the knowledge of the students, can be employed to designate a correct answer to the question projected by the instructor, and each of the students has a series of answer selectors, any of which can be actuated by the student to indicate his answer selection.

Means are provided so that once a student has selected an answer, he cannot then select another answer until the next question is projected. Means are provided whereby the correct answer designation can be entered in the system automatically, and the complete process of questioning, answer designation, and grading can be accomplished automatically.

The full nature of the invention will be understood from the accompanying drawings and the following description and claims.

Figure 2:
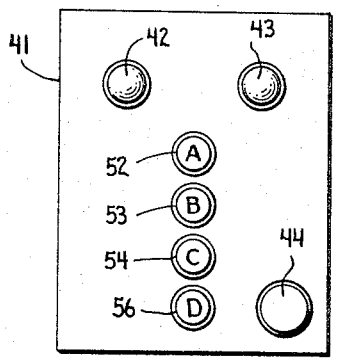
Figure 8:
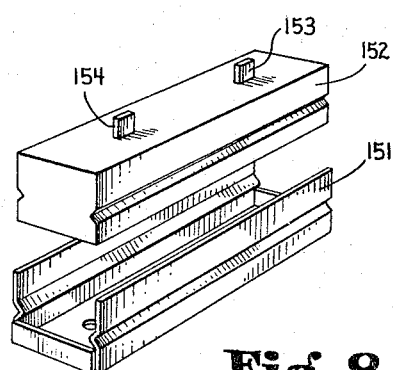
Figure 6:
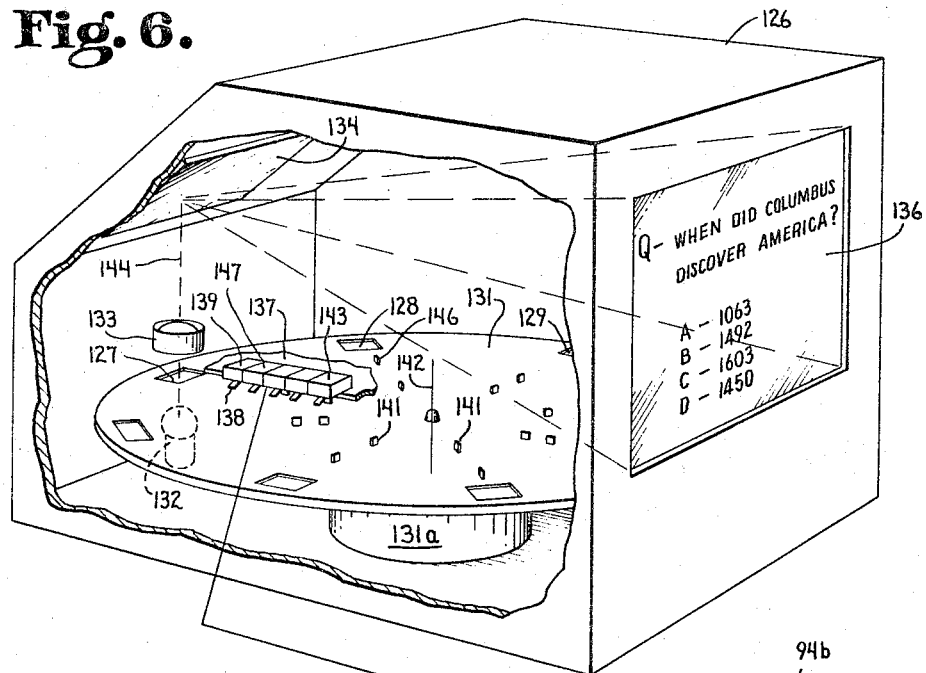
Figure 7:
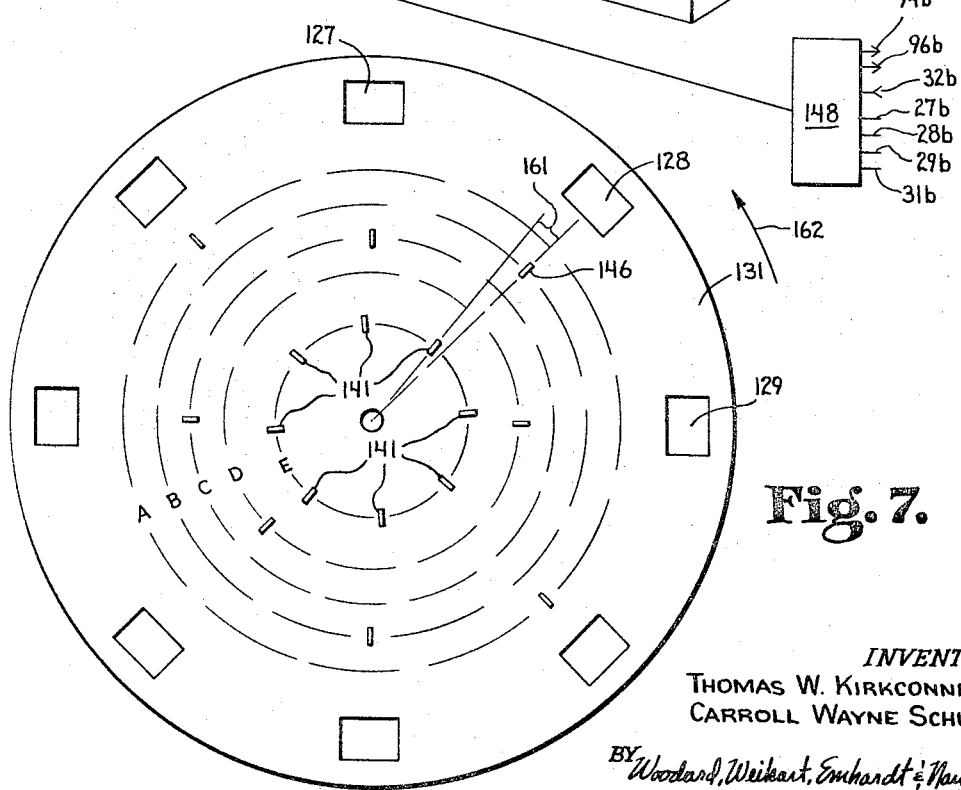

FIG. 1 is a front elevational view of the instructor's unit according to a typical embodiment of the invention.
FIG. 2 is a top plan view of a student's unit.
FIG. 3 is an electrical schematic diagram of the system including the instructor's unit and student's unit and showing the manner of connection of additional student's units.
FIG. 4 is a schematic top plan view of a projection system providing automatic control of the examination of a student.
FIG. 5 is a section thereof in elevation.
FIG. 6 is a perspective view of another type of projection apparatus, with a portion broken away to show interior details.
FIG. 7 is an enlarged top plan view of the slide storage wheel.
FIG. 8 is an exploded perspective view of switch operating means facilitating the changing of question and answer combinations.

Referring to the drawings in detail, and particularly FIG. 1 thereof, the instructor's unit includes a control unit 11 having a plurality of read-out units 12, 13, 14, 16, and 17 mounted thereon, each of the read-out units being identical to the others. As will be seen from the following description, as many read-out units as desired can be employed, one for each student in the classroom.

The front panel of the control unit has a toggle switch 18 to control electrical energy to the system, a red light 19 being provided to indicate that the power is on. A red push button 21 is mounted on the front panel and is used to reset the counters in the read-out units, as will be desscribed.

A series of toggle switches 22, 23, 24, and 26 is provided, and these switches are used by the instructor or classroom monitor to control the circuitry so that when a correct answer is selected by a student, this fact is registered on the counter of the read-out unit for the student. Electrical terminal means 27, 28, 29, and 31 are provided in association with the toggle switches, for connection to an automatic slide projector, if desired, for automatic correct answer designation. The additional terminal means 32 is provided for use in the automatic mode, in a manner which will be described.

The black push button 33 is provided for resetting electrically operated switches in the student's units when a new question is to be asked and answered.

Because all of the read-out units are alike, a description of one will suffice for all. Referring to the read-out unit 12, a green bulb 34 is provided so that when the student at his desk wishes to alert the monitor, he can illuminate the green bulb on his particular read-out unit. An amber bulb 36 is also provided and this bulb, when illuminated, means that a question is ready to be answered.

Each read-out unit also includes a window 37 exposing the register 38 of a counter which advances one step each time a student makes a correct answer, and thereby totals the correct answers made by the student and presents them for quick observation by the classroom monitor. A push button 39 is provided so that the monitor can signal the student individually, whenever desired.

Referring now to FIG. 2, which shows a top plan view of the individual student's unit, the box 41 has a green bulb 42 thereon which is illuminated when the monitor presses the button 39. It has an amber bulb 43 thereon which is illuminated at the same time that the amber bulb 36 on the student's read-out unit is illuminated. A button 44 is provided so that the student can illuminate the green bulb 34 on his read-out unit at the monitor's station.

Each student unit includes a series of four answer-selector buttons 52, 53, 54, and 56. The number of these buttons is the same as the number of answer designators on the master control unit 11. Means are provided whereby no two of the buttons can be operated at the same time, and each button operates a pair of switches as will become apparent in the following description.

Referring now to the electrical schematic diagram of FIG. 3, the master control unit 11, read-out unit 12, and student's remote unit 41 are shown by the dotted outlines. Electrical energy is supplied from the standard plug 57 through the fuse 58 to the line 59 and, from the plug 57 through the power switch 18 to the line 61. Typically, 115 volt, 60-cycle alternating current electrical energy is provided at the plug 57. The power light 19 indicates when the switch 18 is closed and a potential is developed across the lines 59 and 61.

To obtain a source of direct current electrical energy, a full wave diode bridge 62 is connected to the lines 59 and 61 and produces direct current on conductors 63 and 64 which is filtered by the resistor 66 and capacitors 67 to provide a filtered full wave direct current supply at the conductors 68 and 69.

Terminals 59a and 61a are provided on the control unit and the alternating current potential is provided thereacross whenever the power switch is closed and the fuse is intact. A terminal 71a is also provided and is connectable to the line 61 by the new question switch when the button 33 thereof completes a path from the terminal 71a through the conductor 71 to the conductor 61. This switch 33 is a spring-loaded type of switch and immediately returns to open position as soon as the manual effort thereon is released. This switch appears on the front panel of the control unit as shown in FIG. 1.

A terminal 69a is also provided on the control unit and the potential of the conductor 69 is always present at this point. A terminal 72a is also provided and, when the counter-reset switch button 21 is depressed, a path from the terminal 72a is completed through the conductor 72 to the conductor 68, thereby providing the direct current potential of the filtered supply across the conductors 68 and 69 across the terminals 69a and 72a. Terminals 22a, 23a, 24a and 26a are also provided on the control unit and, the potential of conductor 68 is attainable on any of these four terminals when the respective toggle switch therefor is closed. When the toggle switch therefor is opened, the potential is again removed from the terminal. The terminals 27, 28, 29, and 31, which also appear in FIG. 1, are connected to these four output terminals of the control unit, for connection to an automatic slide projector if desired. Likewise, the terminal 32 is shown in FIG. 1 and it always has the potential of conductor 68 present thereon.

Referring further to FIG. 3, the read-out unit 12 has a number of terminals thereon bearing the same reference numerals as terminals of the control unit 11, but having the postscript b. When the read-out unit is connected to the control unit, the terminals thereof bearing the same number as terminals on the control unit are connected together, and typically, plug and socket arrangements are employed for this purpose. In like manner, the read-out unit has a plurality of terminals thereon connected to the remote unit. The matching terminals are given the same reference numerals and different postscripts. In the read-out unit, the conductor between 61b and 61c, and the conductors between the terminals 22b and 22c, for example, have no connections to any other circuit elements in the read-out unit. If desired, therefore, the specific terminals for these conductors can be deleted from the read-out unit and connections directly from the remote unit to the control unit can be made. The determination of the most practical arrangement will be dictated largely by mechanical convenience.

However, in the read-out unit, certain specific circuit elements are connected to other terminals. For example, the amber bulb 36 is connected through a resistor 73 to the terminal 59b. Likewise, the student call switch operated by button 39 is connected to terminal 59 as is the green bulb 34. Terminals 36c, 39c, and 34c are provided and connected to the bulbs 36, switch 39, and bulb 34, respectively. A counter advancing coil 74 is connected between the terminal 69b and terminal 74c of the read-out unit. This coil is for advancing the counter register 38 one unit each time the coil is energized.

A counter reset coil 76 is connected between the terminal 72b and terminal 69b. This counter, when energized, returns the register to zero.

Referring now to the remote unit 41, the amber bulb 43 and resistor 77 are connected in a series across the terminals 36d and 59d. The green bulb 42 and resistor 78 are connected in series across the terminals 39d and 61d. The instructor call switch 44 is connected across the terminals 34d and 61d.

A double pole single throw relay 79 is provided and includes a first normally-closed switch 81 and a second normally-closed switch 82, a relay setting coil 83 for opening these switches, and a relay resetting coil 84 for closing these switches. The coil 84 is connected between the terminals 59d and 71d. One end of the coil 83 is connected to the terminal 59d. However, the other end is connected to stationary contacts of switches which will now be described.

Each of the answer selector buttons 52, 53, 54, and 56, of FIG. 2 is also shown in FIG. 3 and each has an upper and lower bridging contactor connected thereto. Referring particularly to the switch button 52, the upper bridging contactor 86 thereof is disposed to bridge the contact points 87 and 88 when the button is depressed. The lower bridging contactor 89 thereof is disposed to bridge the points 91 and 92 when the button is depressed. When the upper points 87 and 88 are bridged, a circuit path is completed from the answer designator switch 22 of the control unit through the normally-closed relay switch 81 through the counter advance coil 74 to the direct current supply source 62. When the lower contact points 91 and 92 are bridged, a circuit path is completed from the alternating current supply terminal 59a of the control unit through the relay setting coil 83 to the alternating current supply terminal 61a of the control unit. The purpose of the upper two contact points is to advance the counter when the student selects the correct answer. The purpose of the lower two contact points is to electrically disable the remaining selector buttons once the student has made a selection by pressing one of the buttons.

It is desirable that each of the selector switch buttons be spring loaded and not lock in a switch closing condition. It is also desirable that the upper contact points be bridged just before the lower contact points are bridged so that the counter can be advanced before the relay switch 81 is opened by the relay setting coil 83.

For the purposes of the present invention, a switch which can be readily employed is such as that shown in the patent to William E. Dumke et al., 2,935,577, granted May 3, 1960. That patent discloses a rather versatile type of switch arrangement. For the purposes of the present invention, the switch is usually employed with the arrangement described in column 4 of the patent, lines 29 through 45 which describes means preventing switch actuation by more than one button at a time. Also, the non-locking switch button operation achieved by the means described in column 6, lines 34 through 46 of the patent is preferred. By simply bending switch contacts or adjustment of contact positions, the sequential operation of the bridging contactors for any one of the switch buttons and all of the switch buttons can be readily achieved. The aforesaid patent does not employ bridging contactors but the switches can be arranged readily to first close one circuit path and immediately thereafter close a second circuit path as described herein for proper operation of applicants' system.

The read-out unit 13 is connected to the control unit in the same way as read-out unit 12, and has a student's remote unit 93 connected thereto in the same way as the remote unit 41 is connected to the read-out unit 12. The remote unit 93 is exactly like remote unit 41.

*Operation*

In the operation of the present invention, the typical practice is for each student to have a remote unit on his desk, each of the remote units being connected by suitable cable to the read-out unit corresponding to that student and which is mounted to the master control unit at the instructor's or monitor's desk in the class room. The instructor closes the switch 18 turning on the power whereupon the power light is lighted. He pushes the counter reset button which closes a circuit through the counter reset coil for each of the read-out units so that the counter for each student is reset to zero, all of the counters being reset simultaneously. Then the monitor pushes the new question button 33. This closes the circuit through the relay reset coil 84 for each of the student's remote units whereupon the switches 81 and 82 are closed. The closing of the switch 82 in the remote unit causes the amber lights in the remote unit and the read-out unit to be lighted. This occurs simultaneously for all remote units and all read-out units as soon as the new question button 33 is depressed. This button then returns to open the switch 33 when the manual pressure is released. The call switch buttons 39 and 41 are not disturbed, and the green lamps 34 and 42 are not lighted. Everything is now ready for a question to be presented.

The classroom monitor may then write a question on the blackboard, or may read a question, or he may use an automatic slide projector to project a question on a screen. The question is thereby simultaneously presented to all of the students in the classroom. Then a selection of four possible answers is presented, one of which is the correct answer. Each answer is identified as by a letter or a number. For example, in case letters are used, one answer can be identified A, the next answer B, the third answer C, and the fourth answer D. Assume that the B answer is the correct answer. The monitor closes switch 23 which designates the B answer as the correct answer. He does this without the students knowing which is the correct answer, the switches on the master control panel being out of their view. Each of the students may then push one of the four buttons on his remote unit, depending upon which answer he believes to be the correct answer.

If the student selects the "A" answer, he will push the button 52. This will close a path between the switch 22 and the terminal 69a of the direct current source, this path being through the counter advance coil 74. However, the answer designator switch 22 is open, because this is not the right answer, switch 23 being closed. Therefore, a circuit is not completed from the direct current source through the counter advance coil and back to the direct current source. Consequently, the counter is not advanced. However, immediately after the contact points 87 and 88 are closed, the points 91 and 92 are closed. This energizes the relay set coil 83 opening the switches 81 and 82. Opening of the switch 82 extinguishes the amber lights both at the remote unit and at the read-out unit whereupon the monitor knows that the student has made a selection. Opening of the switch 81 makes it impossible for the student to advance the counter even if the then proceeds to push the other buttons. As mentioned above, the switch construction in the remote unit is made so that only one of the selector buttons at a time can be used to cause switching events. Therefore, once the student has made a selection, he has no longer a chance for advancing the counter.

Assume that the student has made the correct selection and pushed the button 53 selecting the "B" answer. The switch 23 in the control unit has already been closed by the monitor so that when the upper contacts of the switch actuated by button 53 are bridged, the counter is advanced one unit. Immediately after the bridging of the upper contacts, the lower contacts are bridged opening the relay switches 81 and 82. This prevents a student from pushing the button again and advancing the counter again.

The action of each student affects only his own particular read-out unit and has no effect on the other read-out units or on the control unit. Therefore, each student can take the amount of time required to make his decision. The monitor can move along from one question to the next, however, whenever he wishes, and the number of amber lights on the read-out units which are still lighted indicates to him the number of students who have not yet made a selection for the question which is at the moment being considered. As soon as the monitor is ready to project the next question to the class, he so indicates and pushes the new question button 33 which resets the relays in each of the remote units whereupon all the amber lights are again turned on. He also opens the switch 23 and closes the switch which represents the correct answer for the next question. When he projects the next question, the students proceed to make their selection as just described.

It has been mentioned that the two switches actuated by each of the four answer selector buttons are operated sequentially at very short intervals. The difference in time between closing of the first switch and closing of the second switch need only be the fraction of a second necessary for the counter to advance one unit. Therefore, it is quite impossible for a student to be able to determine just how far he need push a button to advance the counter without setting the relay which opens the counter circuit. Therefore, complete cheat-proofing is assured in what is basically a very simple apparatus.

As indicated previously, it is possible that from time to time a student may wish to attract the attention of the monitor, or vice versa. For this purpose, the buttons 39 and 44 are provided with the green lamps which can be lighted thereby. It has also been mentioned that the questions can be projected by the use of an automatic slide projector. The correct answers can also be designated automatically by the use of a projector. For this purpose, the terminals 27, 28, 29, and 31 are provided and each of the slides on which a question is provided in the projector is provided with a terminal strip which, when the slide is moved to position for projection, completes a circuit from the terminal 32 to the appropriate one of the four terminals 27, 28, 29, and 31 through the conductive strip on the slide so that the effect is the same as if the monitor were manually operating one of the four switches 22, 23, 24, and 26. For example, referring to FIG. 4 and following, an automatic slide projector 101 includes a lamp 102, lens system 103, plurality of slides 104, slide changing mechanism 106 and projects onto a screen 107. Each of the slides of the plurality includes a holder 108 with the slide 109 therein containing a question such as "When did Columbus discover America?". The slide also contains four possible answer selections, A, B, C and D, which are 1063, 1492, 1603, and 1450, respectively. Each of the slide holders has a strip of foil or other electrically conductive material 111 folded around the marginal edge 112 thereof to be exposed on the front and rear faces of the slide holder. A pair of contactors 113 and 114 is provided in a fixed position on the projector, these typically being spring contators and as the slide is automatically moved into projection position by movement in the direction of the arrow 116, a connection between contactors 113 and 114 is made through the electrically conductive strip 111 mounted on the slide holder. Because contactors 113 and 114 are connected to terminals 94a and 96a, connected to terminals 94 and 96, respectively of FIG. 3, the effect of moving the slide into projection position is the same as that of closing the new question switch manually by actuation of the button 33, as described above. This resets the selector switch in each student's unit to make ready for selection of the appropriate answer to the next question, that being on the slide which is now in position for projection.

Four additional pairs of contactors are mounted on the projector to perform the function which would otherwise be performed by the switches 22, 23, 24, and 26 in the master control unit during manual operation thereof. For example, assuming as before that the "B" answer is the correct answer, during manual operation the monitor would close switch 23. To achieve the same result with automatic operation controlled by the projector, a strip 117 of foil is mounted on the slide holder 108 at a location corresponding to strip 111 but spaced thereabove a sufficient distance so that when the slide is moved into position for projection onto the screen, the strip 117 makes a connection between the contactors 118 and 119 which are connected, respectively, to the terminals 28a and 32a. These two terminals, being plugged into the corresponding terminals 28 and 32, respectively, of the master control unit, effectively place the contactors 118 and 119 in parallel with switch 23. Therefore the positioning of the slide in position to project the question and multiple choice answers on the screen is effective to enable closure of the correct answer selector circuit branch, so that when the student pushes switch button 53 in the answering unit, the selection of a correct answer will be registered on the counter. In contrast, however, if the wrong answer button is pushed, there will be no registration of a correct answer and the relay will again be set to disable selection of another answer until the next slide is automatically inserted by the projector.

As shown in the drawing, there are three other pairs of contactors provided in the projector and these are useful for enabling other answer selector circuit branches to activate the counter when multiple choice answers other than the "B" answer are the correct answers. Accordingly, other slides would be provided with foil like foil 117 at any one of the other three locations on the slide designated by the dotted lines and reference numerals 121, 122, and 123 in the drawings.

As shown in FIGURES 4 and 5, contactors 113 and 114 are offset substantially from contactors 118 and 119. Accordingly, during insertion of the slide in the direction of arrow 116 for projection, the resetting foil strip 111 will first make a connection between contactors 113 and 114 and then break the connection before any other foil strip will make a connection between the contactors which it it intended to bridge. For example, strip 111 will both make and break connection between contactors 113 and 114 before strip 117 first makes a connection between contactors 118 and 119. This prevents continued energization of the resetting coil 84 of the relay when the slide has come to rest in the projecting position in the projector, indicated by the dotted outline in FIGURE 5.

As the slide is withdrawn from projection position, the correct answer foil strip will break contact before the resetting foil strip 111 makes contact. So even though the relay is reset by strip 111 during removal of the slide, the counter will not be advanced even though the student may continue holding the correct answer button for that slide. If he continues to hold this button during insertion of the next slide, he may miss his turn on that next slide, because he keeps the relay setting coil 83 energized during the instant that the resetting foil strip of that slide energizes the resetting coil of the relay, thus defeating the reset function. Consequently the relay remains in the set condition, keeping open switch 81 thereof. So even if the button the student is holding happens to be the right answer button, the counter still cannot be advanced, nor can subsequent depression of the correct answer button advance the counter. The classroom monitor can instruct the student in advance as to the hazard of holding onto a button, so that the student will not lose a turn in this way. This feature further discourages any attempted cheating by button manipulation.

Another type of slide projection apparatus is shown in FIGS. 6 and 7. The projector 126 can be a commercially available unit incorporating a self-contained slide projector and screen assembly. An example is a Model 55, Picture-Vision Projector manufactured by the Picture Recording Company of Oconomowoc, Wisconsin. This machine incorporates slides 127, 128, 129 and a number of additional slides on a large wheel 131. These slides are circularly spaced on the wheel and there is a motor and drive mechanism 131a coupled to the wheel for the automatic driving thereof. The wheel stops briefly in each of a number index positions equal to the number of slides thereon. In the position shown, slide 127 is in a beam of light from the lamp 132, the light from the slide being passed through the focusing lens 133 to the mirror 134 from which it is projected onto the screen 136. In the illustrated example, the slide 127 has the question "When did Columbus discover America?" thereon, with four possible choices of answer, each having a different one of the identification legends "A," "B," "C" and "D." A deck of five snap-action switches of the "micro-switch" type is provided, these switches being aligned in the deck 137. Each of these switches has an actuator such as the actuator 138 for the switch 139. Each one of four of these switches has one contactor thereof connected to a socket for connection to terminal 32 of FIG. 3 and each different one of the four switches has a plug connected to the other contactor thereof for connection to one of the four sockets 27, 28, 29 and 31 of FIG. 3. Therefore, by providing appropriate operating cams or lugs on the slide holder wheel 131 at the various slide locations thereon, an appropriate one of the switches in the deck 137 can be actuated for each different one of the slides. Each different one of these four switches is connected in parallel with a different one of the four manually operable answer designating switches 22, 23, 24, and 26 of FIG. 3.

An example of the arrangement can be appreciated upon further reference to the drawings wherein lugs or cams 141 are provided in a first circle around the rotational axis 142 of the wheel 131, and each of these lugs is provided on a radial line extending from the axis to one of the slides. This serves to operate the switch 143 each time one of the slides is placed in the light path 144 from the lamp to the mirror and the switch 143 of the projector is connected across the terminals 94 and 96 of the master control unit of FIG. 3 to automatically perform the function which, under manual operation, is performed by the new question switch 33 described above.

In addition to there being one lug 141 for each slide, there is another lug for operation of the appropriate one of the remaining four switches of the switch deck 137. For example, if we consider four concentric circular tracks on the wheel, with each of the tracks being at a different radius from the axis 142 and located under a different one of the actuators for the micro-switches, the lug for any one slide can be located in the appropriate track to designate the answer corresponding to that particular slide. For example, if the B answer for slide 128 is the correct answer, the lug 146 thereof is in the B track to actuate the micro-switch 147 when slide 128 is placed in the light path of the projector. As described above with reference to the embodiment of FIGURES 4 and 5, it is desirable during advance of a new slide to the projection position, to close and open the new question switch before the correct answer enabling switch is closed. Accordingly, while both the lugs corresponding to a particular slide may be located on radial lines, they should be angularly offset as indicated at 161 in FIG. 7. Therefore, during movement of the slide wheel in the direction of the arrow 162 to place slide 128 in the projection position in the light path of the projector, the new question switch 143 is closed and opened before switch 147 is closed by the lug 146.

To facilitate making a connection from the projector and screen machine 126 to the master control unit, a plug and socket assembly 148 can be provided and include plugs 27b, 28b, and 31b and socket 32b for connection to sockets and the plugs respectively, having corresponding digits in the master control unit. These terminals of the plug assembly 148 are connected to the appropriate contactors of the four switches of the switch deck which are used for the correct answer designation. The terminals 94b and 96b are connected to the switch 143 of the projector and are plugged into the corresponding connectors of the master control unit.

In order to enable replacement of slides in the wheel and employment of different correct answer combinations, the arrangement shown in FIG. 8 can be used wherein a plurality of mounting clips 151 is circularly spaced around the wheel, each clip being located on one of the radial lines from the center of the wheel to a slide. A block 152 having a lug 153 thereon for operation of switch 143 is provided with another lug 154 at the appropriate radial location with respect to the center to conform to the correct answer of the particular slide with which the block is associated. These clips accommodate blocks having other arrangements of lugs for use with other slides or slides having differently identified correct answers. For example, one of the blocks could have the answer designating lug thereon aligned with the outer track and outer switch of the switch deck if it is the "A" answer which is the correct one of the choices for that particular slide. Another block could have the lug thereon located for actuation of the switch aligned with the "C" track for operation of that switch for a slide in which the "C" answer is the correct answer. This would enable changing the slide and answer arrangement at will by the teacher to avoid any chance of the students memorizing the answer sequence.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An automatic grading machine comprising: a master control unit operable by a monitor, a first remote unit operable by a student to be tested, said master unit having a plurality of output terminals thereon, and said remote unit having a plurality of input terminals, with each different one of said input terminals being coupled to a different one of said output terminals by a conductor long enough to permit location of said remote unit apart from said master unit, said remote unit having a plurality of answer selector switches therein, each different one of said switches having a first contactor connected to a different one of said input terminals, a first switch connected in common to another contactor of each of said selector switches, a first electrically operable counter coupled to said first switch, and enabling switch means coupled to an energy source and to said output terminals and operable when actuated to energize a certain one of said output terminals thereby enabling the specific one of said answer selector switches which is coupled to said certain output terminal to advance said counter, said first switch being a normally-closed, electrically-operable switch having an operator which is operable, when energized, to open said first switch to disable further advance of said counter, each of said selector switches having third and fourth contactors thereon, said third contactors being connected in common to one side of said energy source and said fourth contactors being connected in common and in series with said operator and through said operator to the other side of said energy source whereby said operator is energized whenever any of said selector switches makes contact between the third and fourth contactors thereof, said operator thereupon opening said first switch to disable further advance of said counter.

2. The machine of claim 1 wherein each of said selector switches is arranged to make contact between said third and fourth contactors thereof immediately after contact is made between the first and second contactors thereof.

3. The combination of claim 1 wherein said selector switches are provided with different identifying indicia therefor corresponding to identifying indicia on multiple choice answer to questions presented by the monitor of said master control unit.

4. An automatic grading machine comprising: a master control unit operable by a monitor, a first remote unit operable by a student to be tested, said master unit having a plurality of output terminals thereon, and said remote unit having a plurality of input terminals, with each different one of said input terminals being coupled to a different one of said output terminals by a conductor long enough to permit location of said remote unit apart from said master unit, said remote unit having a plurality of answer selector switches therein, each different one of said switches having a first contactor connected to a different one of said input terminals, a first switch connected in common to another contactor of each of said selector switches, a first electrically operable counter coupled to said first switch, and enabling switch means coupled to an energy source and to said output terminals and operable when actuated to energize a certain one of said output terminals thereby enabling the specific one of said answer selector switches which is coupled to said certain output terminal to advance said counter, said first switch being a normally-closed, electrically-operable switch having an operator which is operable, when energized, to open said first switch to disable further advance of said counter; means operable upon actuation of any of said selector switches to actuate said operator to open said first switch; projector means having a plurality of slides therein, and having means associated with said slides for operating said enabling switch means, said enabling switch means including a plurality of normally-open enabling switches, each enabling switch being coupled to said energy source and to a different one of said output terminals, whereby a certain one of said enabling switches is operated when a certain slide is moved into projecting position in said projector means whereupon said slide is projected onto said screen and the appropriate one of said answer selector switches is enabled to advance said counter, and said slide means having reset switch means associated therewith and operable upon positioning a slide for projection to re-close said first switch.

5. The machine of claim 4 and further comprising: a second normally-closed, electrically-operable switch controlled by said operator for said first switch for operation together with said first switch, and an indicator in circuit with said source and said second switch and normally energized when said second switch is closed.

6. The machine of claim 5 and further comprising: a plurality of readout units associated with said master unit, the number of said readout units corresponding to the number of said remote units, one of said readout units comprising said counter and said indicator and each other readout unit being like said one readout unit, said first and second electrically operable switches and the said operator therefor being associated with said first remote unit and said one readout unit for control of the counter of said one readout unit by the selector switches of said first remote unit only, whereby the score of the person using said first remote unit and the fact that he has answered a question are indicated at said one readout unit; and a plurality of electrically operable switch and counter combinations like said first switch and first counter, each different one of said combinations being associated with a different one of said remote and readout units, whereby the testing and scoring of as many persons as there are remote units can be accomplished simultaneously.

7. An automatic grading machine comprising: a master control unit operable by a monitor, a first remote unit operable by a student to be tested, said master unit having a plurality of output terminals thereon, and said remote unit having a plurality of input terminals, with each different one of said input terminals being coupled to a different one of said output terminals by a conductor long enough to permit location of said remote unit apart from said master unit, said remote unit having a plurality of answer selector switches therein, each different one of said switches having a first contactor connected to a different one of said input terminals, a first switch connected in common to another contactor of each of said selector switches, a first electrically operable counter coupled to said first switch, and enabling switch means coupled to an energy source and to said output terminals and operable when actuated to energize a certain one of said output terminals thereby enabling the specific one of said answer selector switches which is coupled to said certain output terminal to advance said counter, said first switch being a normally-closed, electrically-operable switch having an operator which is operable, when energized, to open said first switch to disable further advance of said counter, and a plurality of remote units like said first remote unit, the input terminals of said remote units being coupled to said output terminals of said master control unit.

8. An automatic grading machine comprising:
a master control unit operable by a monitor, a first remote unit operable by a student to be tested, said master unit having a plurality of output terminals thereon, and said remote unit having a plurality of input terminals, with each different one of said input terminals being coupled to a different one of said output terminals by a conductor long enough to permit location of said remote unit apart from said master unit, said remote unit having a plurality of answer selector switches therein, each different one of said switches having a first contactor connected to a different one of said input terminals, a first switch connected in common to another contactor of each of said selector switches, a first electrically operable counter coupled to said first switch, and enabling switch means coupled to an energy source and to said output terminals and operable when actuated to energize a certain one of said output terminals thereby enabling the specific one of said answer selector switches which is coupled to said certain output terminals to advance said counter, said enabling switch means including a plurality of normally-open enabling switches, each enabling switch having a first contactor connected to said source and each different one of said enabling switches having a second contactor connected to a different one of said output terminals, a plurality of remote units like said first said remote unit and spaced from said first remote unit and from each other, slide projector means having a projection screen positioned to be visible to students at the locations of said remote units operated by the students, said projector means having a plurality of different slides, each slide having a question thereon and a plurality of different answers to said question from which each student is to select the answer he considers correct, each different answer for a slide having different identifying indicia associated therewith, one of said answers being the correct answer, said projector means having slide changer means therein for projecting one slide after another onto said screen, and means associated with each slide for closing one of said enabling switches at each of said remote units, closing means for a particular slide being arranged to simultaneously close at all of said remote units the particular enabling switch thereof corresponding to the correct answer for that particular slide, whereby each different slide, when projected, enables the appropriate answer selector switch for that slide to advance said counter.

9. The machine of claim 8 wherein said slides are mounted in a disk rotatable on an axis, and each of said enabling switches has an actuator therefor, with the actuators of said switches being located at different radii from the said axis of rotation of said disk, said slides being spaced apart in a circle around said axis, and each particular slide location on said disk having an enabling switch operator associated therewith and located to operate the appropriate enabling switch actuator when the slide in that particular location is in position for projection thereof onto said screen by said projector means, to enable that selector switch in each student's remote unit which corresponds to the correct answer to advance said counter.

References Cited
UNITED STATES PATENTS

| | | | |
|---|---|---|---|
| 2,738,595 | 3/1956 | John et al. | 35—48 |
| 3,095,654 | 7/1963 | Cummings | 35—48 X |
| 3,096,592 | 7/1963 | Schuster | 35—48 X |
| 3,175,303 | 3/1965 | Kirkconnell | 35—48 X |
| 3,186,109 | 6/1965 | Brinton | 35—48 X |
| 3,190,014 | 6/1965 | Rhodes | 35—48 |
| 3,199,230 | 8/1965 | Sylvester et al. | 35—48 |

EUGENE R. CAPOZIO, *Primary Examiner.*

S. M. BENDER, R. WEIG, *Assistant Examiners.*